US009259016B2

(12) United States Patent
Mohammed et al.

(10) Patent No.: US 9,259,016 B2
(45) Date of Patent: Feb. 16, 2016

(54) AUTOMATIC FROZEN FOOD PRODUCT VENDING MACHINE

(71) Applicant: PW Stoelting, L.L.C., Sheboygan, WI (US)

(72) Inventors: Aamer Mohammed, Manitowoc, WI (US); Dave Wattenford, Sheboygan, WI (US); Jeff Pagel, Kiel, WI (US); Ken Wetenkamp, Plymouth, WI (US)

(73) Assignee: PW Stoelting, L.L.C., Sheboygan, WI (US)

( * ) Notice: Subject to any disclaimer, the term of this patent is extended or adjusted under 35 U.S.C. 154(b) by 342 days.

(21) Appl. No.: 13/830,974

(22) Filed: Mar. 14, 2013

(65) Prior Publication Data
US 2014/0261873 A1 Sep. 18, 2014

(51) Int. Cl.
*G07F 13/10* (2006.01)
*A23G 9/28* (2006.01)
*G07F 11/16* (2006.01)
*G07F 13/00* (2006.01)

(52) U.S. Cl.
CPC *A23G 9/283* (2013.01); *A23G 9/28* (2013.01); *G07F 11/16* (2013.01); *G07F 13/00* (2013.01)

(58) Field of Classification Search
CPC ........... G07F 9/10; G07F 9/105; G07F 13/02; G07F 13/04; G07F 13/06; G07F 13/10
USPC ........... 141/1, 9, 82, 83, 94–95, 98, 192–193, 141/104
See application file for complete search history.

(56) References Cited

U.S. PATENT DOCUMENTS

| 2,663,482 | A | * | 12/1953 | Gilberty | 141/36 |
| 3,276,633 | A | * | 10/1966 | Rahauser | 222/129.1 |
| 3,554,364 | A | * | 1/1971 | Lane et al. | 198/746 |
| 3,638,392 | A | | 2/1972 | Welker et al. | |
| 3,863,724 | A | | 2/1975 | Dalia, Jr. | |

(Continued)

FOREIGN PATENT DOCUMENTS

| EP | 0 596 722 | 5/1994 |
| EP | 1 450 318 | 8/2004 |

(Continued)

OTHER PUBLICATIONS

International Search Report and Written Opinion for International Application No. PCT/US2014/017044, mail date May 27, 2014, 11 pages.

*Primary Examiner* — Nicolas A Arnett
(74) *Attorney, Agent, or Firm* — Foley & Lardner LLP

(57) ABSTRACT

An automatic frozen food product vending machine includes a first freezer barrel configured to produce a first frozen food product, a first spigot fluidly connected to the first freezer barrel, the first spigot for dispensing the first frozen food product, a second freezer barrel configured to produce a second frozen food product, a second spigot fluidly connected to the second freezer barrel, the second spigot for dispensing the second frozen food product, a third spigot fluidly connected to both the first freezer barrel and the second freezer barrel, the third spigot for dispensing a mixture of the first and second frozen food products, and a movable platform for supporting a container to receive frozen food product, the movable container movable among a home position, a first fill position below the first spigot, a second fill position below the second spigot, and a third fill position below the third spigot.

16 Claims, 14 Drawing Sheets

(56) References Cited

U.S. PATENT DOCUMENTS

| | | | |
|---|---|---|---|
| 4,098,384 A | 7/1978 | Kovar | |
| 4,226,269 A | 10/1980 | Carr et al. | |
| 4,232,798 A | 11/1980 | Hammel et al. | |
| 4,378,164 A | 3/1983 | Manfroni | |
| 4,446,896 A | 5/1984 | Campagna | |
| 4,469,150 A | 9/1984 | Grimaldi | |
| 4,645,093 A | 2/1987 | Jones | |
| 4,953,751 A | 9/1990 | Shannon | |
| 5,009,330 A | 4/1991 | Young et al. | |
| 5,025,840 A * | 6/1991 | Tacke | 141/253 |
| 5,027,698 A | 7/1991 | Chirnomas | |
| 5,148,905 A | 9/1992 | Tacke et al. | |
| 5,350,082 A | 9/1994 | Kiriakides et al. | |
| 5,353,904 A | 10/1994 | Tacke et al. | |
| 5,382,090 A | 1/1995 | Cocchi | |
| 5,400,614 A | 3/1995 | Feola | |
| 5,450,980 A | 9/1995 | Laidlaw | |
| 5,491,333 A | 2/1996 | Skell et al. | |
| 5,575,066 A | 11/1996 | Cocchi | |
| 5,603,229 A | 2/1997 | Cocchi et al. | |
| 5,615,952 A | 4/1997 | Cocchi | |
| 5,653,118 A | 8/1997 | Cocchi et al. | |
| 5,671,662 A | 9/1997 | Cocchi et al. | |
| 5,727,609 A | 3/1998 | Knight et al. | |
| 5,823,392 A | 10/1998 | Madico | |
| 5,957,040 A | 9/1999 | Feola | |
| 6,082,419 A | 7/2000 | Skell et al. | |
| 6,238,180 B1 | 5/2001 | Magoshi et al. | |
| 6,264,066 B1 | 7/2001 | Vincent et al. | |
| 6,304,796 B1 | 10/2001 | Ding | |
| 6,305,573 B1 | 10/2001 | Fritze et al. | |
| 6,325,250 B1 | 12/2001 | Feola | |
| 6,389,962 B1 | 5/2002 | Han et al. | |
| 6,390,334 B1 | 5/2002 | Kim et al. | |
| 6,424,884 B1 | 7/2002 | Brooke et al. | |
| 6,485,768 B2 | 11/2002 | Feola | |
| 6,598,758 B2 * | 7/2003 | Kim et al. | 221/7 |
| 6,723,361 B2 | 4/2004 | Feola | |
| 6,745,593 B2 | 6/2004 | Cocchi et al. | |
| 6,907,743 B2 | 6/2005 | Cocchi et al. | |
| 7,013,932 B2 | 3/2006 | Berghoff et al. | |
| 7,204,360 B2 | 4/2007 | Rasmussen | |
| 7,299,109 B2 | 11/2007 | Juds et al. | |
| 7,428,824 B1 * | 9/2008 | Malachowsky et al. | 62/340 |
| 7,448,516 B2 | 11/2008 | Davis et al. | |
| 7,476,353 B2 | 1/2009 | Cocchi et al. | |
| 7,750,817 B2 | 7/2010 | Teller | |
| 7,756,604 B1 | 7/2010 | Davis et al. | |
| 7,762,181 B2 | 7/2010 | Boland et al. | |
| 7,815,954 B2 * | 10/2010 | Miller et al. | 426/394 |
| 7,845,375 B2 | 12/2010 | Dorney | |
| 7,885,520 B2 | 2/2011 | Stettes | |
| 7,896,038 B2 | 3/2011 | Jones et al. | |
| 7,899,713 B2 | 3/2011 | Rothschild | |
| 8,091,374 B2 | 1/2012 | Chang | |
| 8,245,735 B2 | 8/2012 | Chase et al. | |
| 8,297,182 B2 | 10/2012 | Cocchi et al. | |
| 8,335,587 B2 | 12/2012 | Feola | |
| 8,404,166 B2 | 3/2013 | Cocchi et al. | |
| 8,479,532 B2 | 7/2013 | Cocchi et al. | |
| 8,496,141 B2 * | 7/2013 | McKay et al. | 222/144.5 |
| 8,579,155 B2 * | 11/2013 | Malachowsky et al. | 222/1 |
| 8,591,097 B2 | 11/2013 | Cocchi et al. | |
| 8,739,565 B2 | 6/2014 | Cocchi et al. | |
| 8,746,295 B2 * | 6/2014 | Mueller et al. | 141/94 |
| 8,869,540 B2 | 10/2014 | Cocchi et al. | |
| 8,944,289 B2 | 2/2015 | Cocchi et al. | |
| 8,978,931 B2 | 3/2015 | Cocchi et al. | |
| 2002/0040915 A1 * | 4/2002 | Kim et al. | 222/146.6 |
| 2002/0113078 A1 * | 8/2002 | Kim et al. | 221/258 |
| 2004/0251270 A1 | 12/2004 | Davis et al. | |
| 2007/0062981 A1 | 3/2007 | Cocchi et al. | |
| 2007/0199614 A1 | 8/2007 | Cocchi et al. | |
| 2007/0210105 A1 | 9/2007 | Malachowsky et al. | |
| 2007/0254084 A1 * | 11/2007 | Cocchi et al. | 426/565 |
| 2008/0153567 A1 | 6/2008 | Juds et al. | |
| 2009/0007984 A1 * | 1/2009 | Nuriely | 141/79 |
| 2009/0139257 A1 | 6/2009 | Cocchi et al. | |
| 2009/0157505 A1 | 6/2009 | Yokoyama | |
| 2009/0238931 A1 * | 9/2009 | Herrick et al. | 426/249 |
| 2009/0293733 A1 | 12/2009 | Martin et al. | |
| 2010/0101235 A1 | 4/2010 | Cocchi et al. | |
| 2010/0122539 A1 | 5/2010 | Cocchi et al. | |
| 2010/0125362 A1 | 5/2010 | Canora et al. | |
| 2011/0006079 A1 * | 1/2011 | McKay et al. | 222/144.5 |
| 2011/0011887 A1 | 1/2011 | Zaniboni et al. | |
| 2011/0101039 A1 | 5/2011 | Cocchi et al. | |
| 2011/0108569 A1 | 5/2011 | Jones et al. | |
| 2011/0256617 A1 | 10/2011 | Cocchi et al. | |
| 2011/0271690 A1 | 11/2011 | Cocchi et al. | |
| 2012/0017606 A1 | 1/2012 | Cocchi et al. | |
| 2012/0103201 A1 | 5/2012 | Cocchi et al. | |
| 2012/0251697 A1 | 10/2012 | Cocchi et al. | |
| 2013/0000338 A1 | 1/2013 | Cocchi et al. | |
| 2013/0014650 A1 | 1/2013 | Cocchi et al. | |
| 2013/0269381 A1 | 10/2013 | Cocchi et al. | |
| 2013/0269540 A1 | 10/2013 | Cocchi et al. | |
| 2014/0212559 A1 | 7/2014 | Cocchi et al. | |
| 2014/0295044 A1 | 10/2014 | Cocchi et al. | |
| 2014/0335250 A1 | 11/2014 | Cocchi et al. | |
| 2014/0348999 A1 | 11/2014 | Cocchi et al. | |
| 2014/0356494 A1 | 12/2014 | Cocchi et al. | |
| 2015/0044331 A1 | 2/2015 | Cocchi et al. | |

FOREIGN PATENT DOCUMENTS

| | | |
|---|---|---|
| EP | 1 829 453 | 6/2011 |
| EP | 2 197 291 | 11/2011 |
| KR | 20-0203220 | 11/2000 |
| KR | 20-0231268 | 7/2001 |
| KR | 20030060379 | 7/2003 |
| WO | WO-2012/007773 | 1/2012 |

* cited by examiner

AUTOMATIC FROZEN FOOD PRODUCT VENDING MACHINE

BACKGROUND

The present invention relates generally to the field of automatic vending machines and, in particular, to the control and automation of frozen food product vending machines.

Frozen food product dispensing machines are used to dispense soft confectionary products such as aerated ice cream, custard, frozen yogurt, sherbets, sorbets, or other similar frozen food products. Most of these dispensing machines are designed similarly and operate in a similar manner. A storage hopper, reservoir, or bag holds a liquid form of the desired dessert product. Air and the liquid are drawn into a freezing chamber where they are mixed and cooled to form the aerated frozen product that is commonly referred to as a "soft-serve" frozen food product.

SUMMARY

One embodiment of the invention relates to an automatic frozen food product vending machine including a first freezer barrel configured to produce a first frozen food product, a first spigot fluidly connected to the first freezer barrel, the first spigot for dispensing the first frozen food product, a second freezer barrel configured to produce a second frozen food product, a second spigot fluidly connected to the second freezer barrel, the second spigot for dispensing the second frozen food product, a third spigot fluidly connected to both the first freezer barrel and the second freezer barrel, the third spigot for dispensing a mixture of the first frozen food product and the second frozen food product, and a movable platform for supporting a container to receive frozen food product, the movable container movable among a home position, a first fill position below the first spigot, a second fill position below the second spigot, and a third fill position below the third spigot.

Another embodiment of the invention relates to a method of operating an automatic frozen food product vending machine including receiving a location input from a user input device, detecting a container on a movable platform, moving the movable container to a fill position under one of three spigots for dispensing a frozen food product in response to the location input, determining an elapsed time for the movable platform to move from a home position the fill position, determining a container size based on the elapsed time, filling the container with frozen food product based on the determined container size, and returning the movable platform to the home position.

Another embodiment of the invention relates to an automatic ice cream cone dispenser including a housing defining a chamber, a first pair of rods disposed within the chamber, the rods movable between a first position in which the rods are horizontally spaced apart a first distance and a second position in which the rods are horizontally spaced apart a second distance greater than the first distance, a second pair of rods disposed within the chamber, the rods movable between a first position in which the rods are horizontally spaced apart the first distance and a second position in which the rods are horizontally spaced apart the second distance greater, wherein the second pair of rods is located vertically above the first pair of rods, an actuator including two guide paths, the first guide path receiving an end of the first rod of the first pair of rods and an end of the first rod of the second pair of rods, the second guide path receiving an end of the second rod of the first pair of rods and an end of the second rod of the second pair of rods, wherein the actuator is movable vertically relative to the housing to move the first pair of rods and the second pair of rods within the two guide paths, and a chute attached to the housing above the chamber, the chute configured to support a stack of ice cream cones.

Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, in which.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Figure 1:
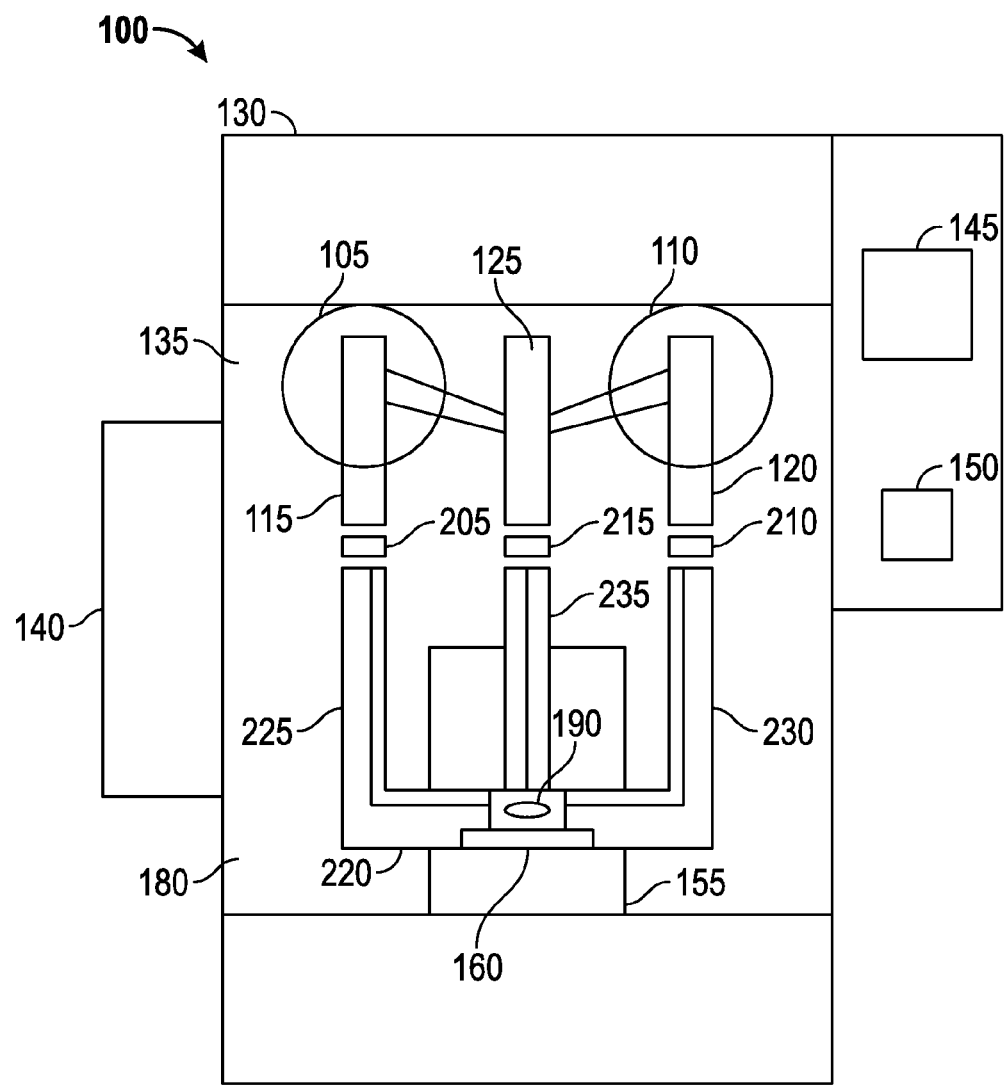
FIG. 1 is a front view of an automatic frozen food product vending machine according to an exemplary embodiment.
Figure 2:
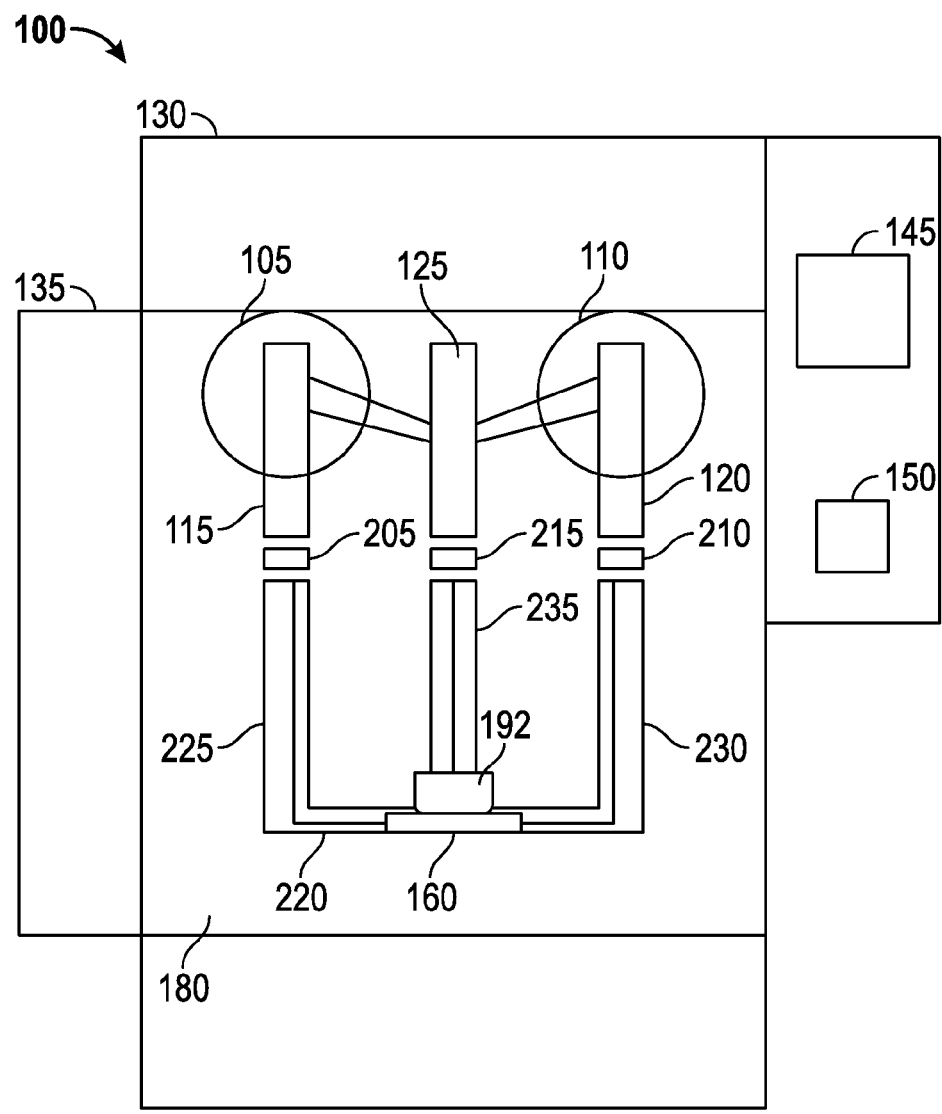
FIG. 2 is a front view of the vending machine of FIG. 1 with a front door open and a movable platform in a first position.
Figure 3:
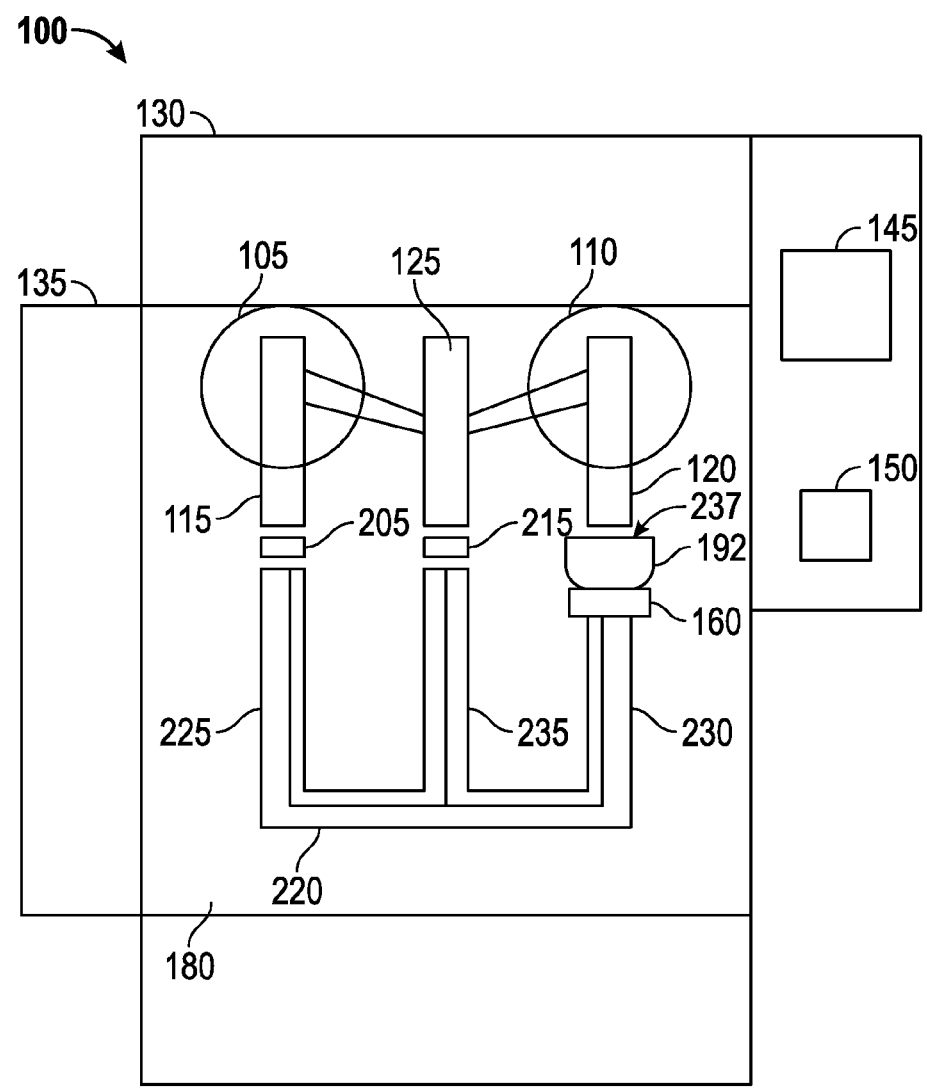
FIG. 3 is a front view of the vending machine of FIG. 1 with the front door open and the movable platform in a second position.

Referring to FIGS. 1-3, an automatic frozen food product vending machine 100 includes two freezer barrels 105 and 110. In some embodiments, each freezer barrel includes a horizontally elongated cylinder enclosing a cylindrical freezing chamber wherein an inner wall is cooled by refrigeration ducts. The freezing chamber contains an auger type blender or other mixing device for agitating and aerating a mixture within the freezing chamber. A dispensing nozzle or spigot 115 and 120 is fluidly connected to each of the freezer barrels 105 and 110, respectively, for dispensing frozen food product from the respective freezer barrel. A third spigot 125 is fluidly connected to both freezer barrels 105 and 110 to dispense a mixture of the frozen food products from the two freezer barrels 105 and 110 (e.g., "twist" soft-serve including both vanilla and chocolate soft serve). The freezer barrels 105 and 115 and other components of the vending machine 100 related to the production and dispensing of the frozen food product are conventional (e.g., those disclosed in U.S. Pat. No. 5,706,720, which is incorporated herein by reference in its entirety).

Vending machine 100 also includes a housing 130 and a front door 135 that moves between a closed position (shown in FIG. 1) and an open position (shown in FIGS. 2-3). In some embodiments, a container holder or dispenser 140 stores containers (e.g., cones, cups, dishes, bowls, etc.) of one or more sizes (e.g., small, medium, large, etc.). A user input device 145 (e.g., a touch screen, a keypad, multiple pushbuttons or switches, etc.) allows a user to make various inputs or selections related to the frozen food product to be prepared by the vending machine 100. A payment acceptor 150 (e.g., paper money, coins, magnetized credit or debit cards, tokens, tickets, coupons, etc.) receives the user's form of payment for the frozen food product to be prepared by the vending machine 100. In some embodiments, the payment acceptor 150 accepts payment in the form of a vending machine specific tender (e.g., tokens, tickets, coupons, magnetized card). For example, the payment acceptor 150 may accept tickets dispensed as a prize from a game of chance (e.g., skee ball, a basketball shooting game, or other carnival or fun-house games). As another example, tokens may be purchased by the user and redeemed for frozen food product by use of the vending machine 100.

The user is able to make a payment via the payment acceptor 150 and select a frozen food product to be prepared (e.g., both size and flavor). The user opens an access door 155 and places a container on a movable container platform 160. The user then closes the access door 155 and the movable platform 160 automatically moves the container beneath the spigot 115, 120, or 125 that provides the selected flavor. The selected flavor is then automatically dispensed in the appropriate amount (i.e., the selected size) into the container. In some embodiments, the spigots 115, 120, and 125 are opened and closed by linear actuators to dispense the appropriate amount of frozen food product. In some embodiments, the movable platform 160 moves downward during dispensing of the frozen food product. This movement may be to provide adequate spacing between the spigot and container for the amount of frozen food product being dispensed or to form "balls" of frozen food product in the container. The movable platform 160 then moves back in line with the access door 155 so the user can open the access door 155 to retrieve the container holding the frozen food product. The movable platform 160 is prevented from moving when the access door 155 is open. In some embodiments, lights, sounds, or other attractive features or entertainment devices are activated while the movable platform 160 is in motion.

Figure 4:
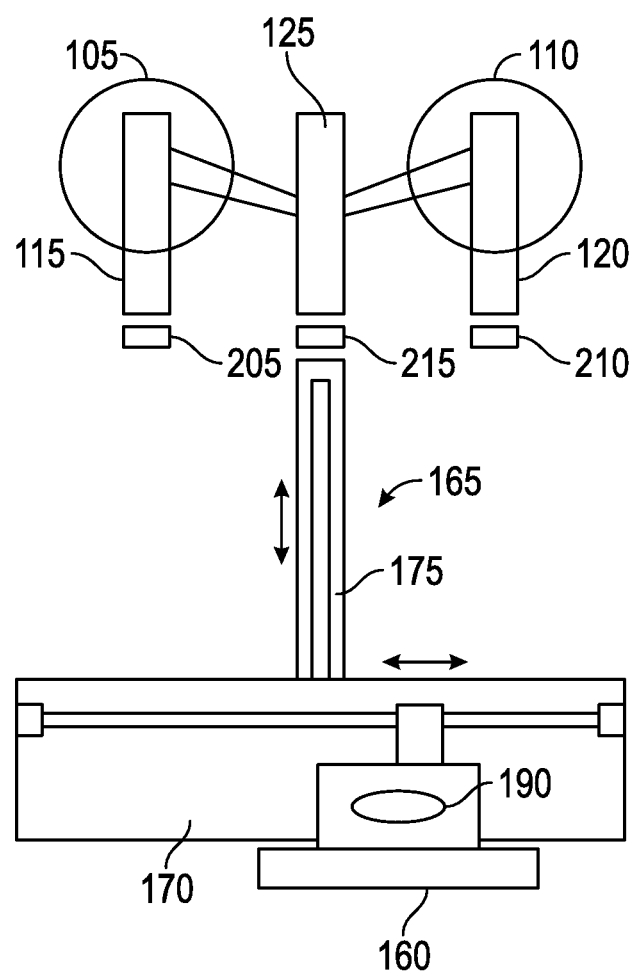
FIG. 4 is a front view of the vending machine of FIG. 1 with a face plate removed.

As shown in FIG. 4, the movable platform 160 is connected to a gantry 165 that is movable in a first direction (e.g., an x-direction) and a second direction substantially perpendicular to the first direction (e.g., a y-direction). Possible methods of motion for the gantry 165 include linear actuators, belt drives, solenoids, air cylinders, rack and pinion gears, cable drawn motion, stepper motors, and the like. In the illustrated embodiment, the gantry 165 includes a horizontally-arranged linear actuator 170 that moves the movable platform 160 in the x-direction and a vertically-arranged linear actuator 175 that moves the movable platform 160 in the y-direction. A face plate 180 (shown in FIGS. 1-3) typically covers the gantry 165 from view during normal operation of the vending machine 100.

Figure 5A:
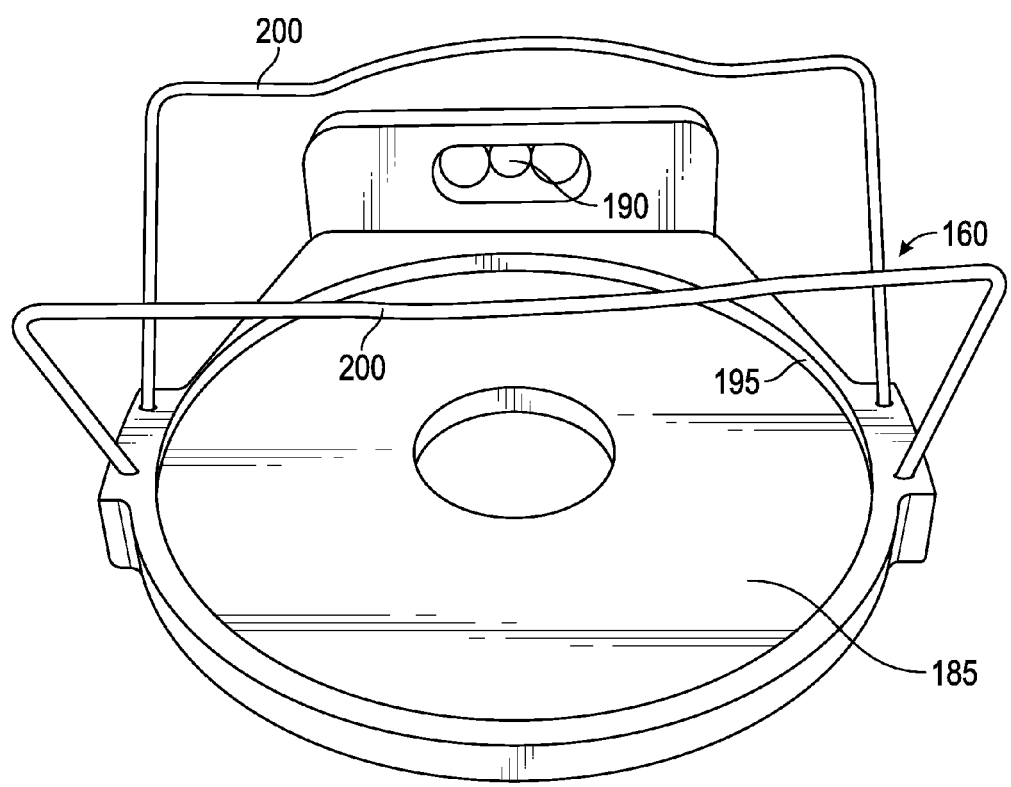
FIG. 5A is perspective view of the movable platform of the vending machine of FIG. 1.
Figure 5B:
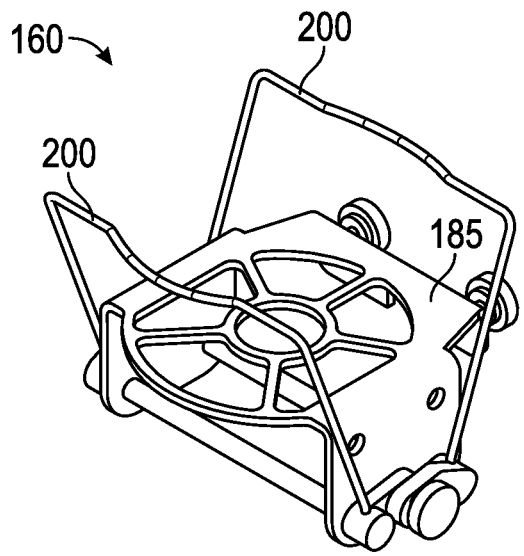
FIG. 5B is a perspective view of an alternative movable platform for use with the vending machine of FIG. 1.
Figure 5C:
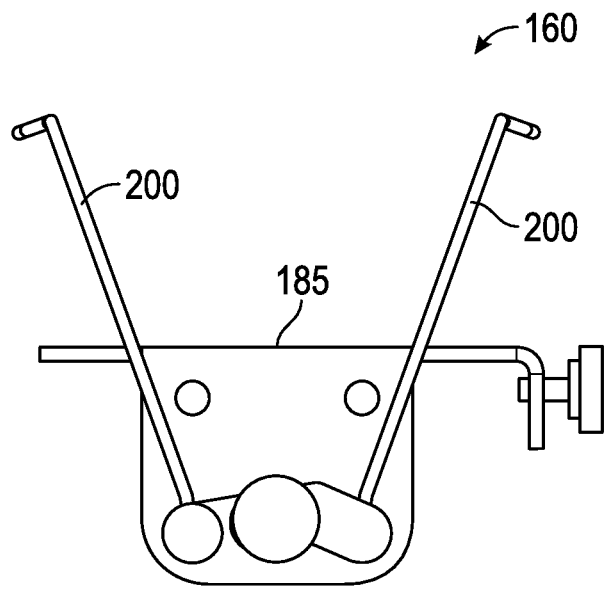
FIG. 5C is a side view of the movable platform of FIG. 5B.
Figure 5D:
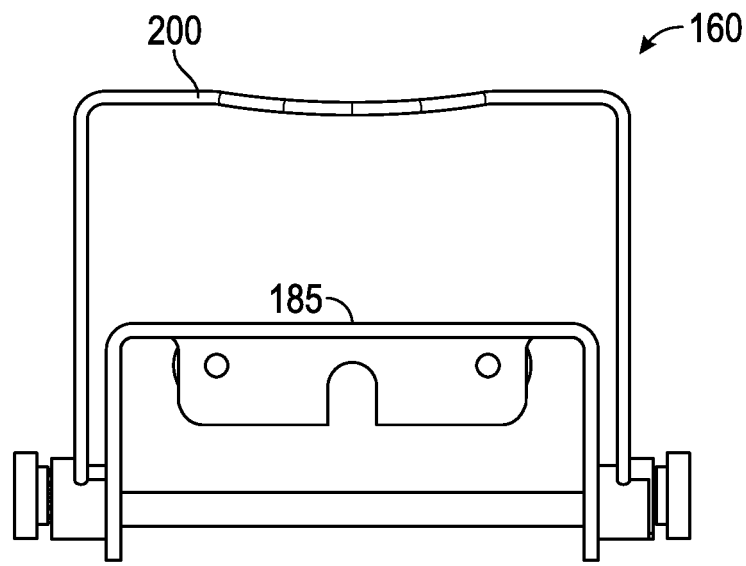
FIG. 5D is a front view of the movable platform of FIG. 5B.
Figure 5E:
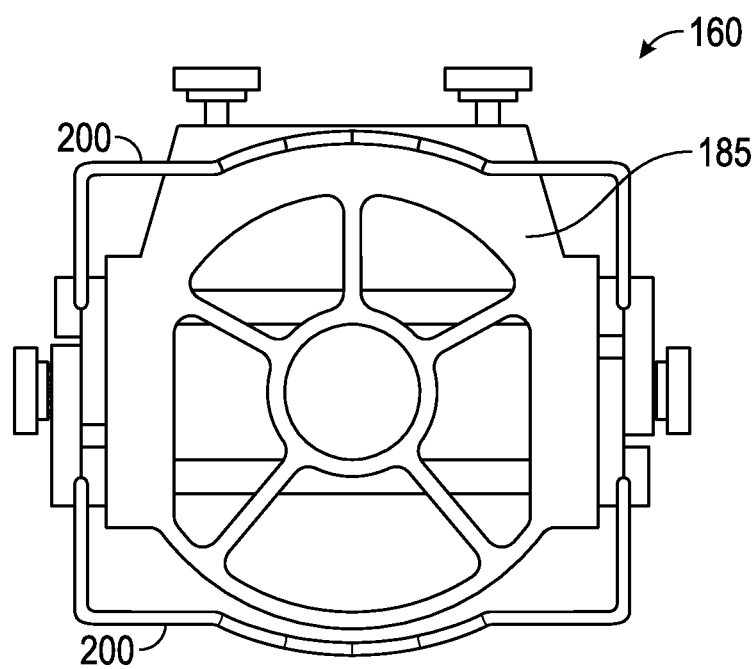
FIG. 5E is a top view of the movable platform of FIG. 5B.

As shown in FIG. 5A, the movable platform 160 includes a support surface 185 for supporting a container and a container proximity or presence sensor 190 for detecting when a container 192 is present on the support surface 185 (as shown in FIG. 2). In some embodiments, the support surface 185 is surrounded by a shoulder or lip 195 that helps to keep a container on the support surface. In some embodiments, one or more clips or retainers 200 secure a container to the movable platform 160. As shown in the FIGS. 5B-5E, in some embodiments, the clips 200 are mechanically adjustable to change the spacing between the clips 200 in order to accommodate different size containers. In some embodiments, the container presence sensor 190 may be a photo eye, an infrared sensor, an inductive sensor, a laser sensor, a limit switch, or other sensor suitable for detecting the presence of a container on the support surface 185.

Proximity or presence sensors 205, 210, 215 are positioned below each of the spigots 115, 120, and 125, respectively. The presence sensors 205, 210, 215 detect when a container on the movable platform 160 has reached a fill position below the corresponding spigot 115, 120, and 125, respectively. In some embodiments, the presence sensors 205, 210, 215 may be a photo eye, an infrared sensor, an inductive sensor, a laser sensor, a limit switch, or other sensor suitable for detecting the presence of a container (e.g., the presence of the top of the container). Movable platform 160 moves along a horizontal track 220 and three vertical tracks 225, 230, and 235 formed in the face plate 180. Each of the vertical tracks 225, 230, and 235 leads to the fill position beneath one of the spigots 115, 120, and 125, respectively.

Movable platform 160 can move between a home position (as shown in FIGS. 1 and 2) in which the movable platform 160 is inline with the access door 155 and the three fill positions. As shown in FIG. 3, the movable platform 160 is at the fill position below the spigot 120. As the movable platform 160 moves towards the appropriate spigot 115, 120, or 125 (in view of the user-selected flavor), the container 192 on the movable platform 160 is detected by the presence sensor 205, 210, or 215 below that spigot. This detection indicates that the movable platform 160 has arrived at the fill position. In some embodiments, the presence sensors 205, 210, and 215 detect the top of the container 192. After the movable platform 160 has reached the fill position, the appropriate spigot 115, 120, or 125 (i.e., the spigot above the fill position at which the movable container is located) dispenses frozen food product 237 into the container 192.

The amount of frozen food product dispensed into the container 192 may be determined in various ways, including by user input (e.g., a container size input made with the user input device 145), by the elapsed time for the movable platform 160 to move from the home position to the fill position, by weight (e.g., as detected by a weight sensor or scale), or by the number of accumulated steps of a stepper motor or stepper motors used to move the gantry 165 from the home position to the fill position.

Different size containers will result in different elapsed times from the time the movable platform 160 begins to move from the home position to the time the movable platform 160 stops movement at a fill position (i.e., when one of the presence sensors 205, 210, or 215 detects the container 192). The elapsed time for the movable platform 160 to move from the home position to the fill position with a relatively tall container (e.g., a large dish) will be less than the time to do so with a relatively short container (e.g. a small dish). The elapsed time required for the movable platform 160 to move from the home position to each of the fill positions for each of the sizes of containers offered for use with a specific vending machine 100 can be determined and these known elapsed times can then be used to determine the size of the container at the fill position based on an actual elapsed time. Similarly, the accumulated number of steps for a stepper motor or stepper motors the gantry 165 to move the movable platform 160 from the home position to the fill position may be used to determine the size of the container at the fill position based on a comparison to the known accumulated number of steps for the various fill positions and sizes of container offered for use with a specific vending machine. In some embodiments, the accumulated steps include the steps for an x-direction stepper motor and the steps for a y-direction stepper motor. In other embodiments, the accumulated steps include the steps for a single direction (e.g., the steps for a y-direction stepper motor).

This elapsed time and accumulated steps methods of container size indication can be used on their own to determine container size or can be used to verify that the user-selected container size (e.g., the container size input made via the user interface device 145) corresponds to the detected container size (e.g., as determined by the elapsed time or accumulated steps). This verification can prevent overfilling a container with too much frozen food product if the user has selected a larger size than the container that is on the movable platform 160. In the event of a mismatch, the container may be filled with the appropriate amount of frozen food product for the container size determined by the elapsed time or accumulated steps method or the movable platform 160 may return to the home position to receive a container of the user-selected size.

Vending machine 100 also includes a controller or processing circuit 240. The processing circuit 240 controls the operation of the vending machine 100 as described herein. The processing circuit 240 includes a processor 245 and memory 250.

Figure 6:
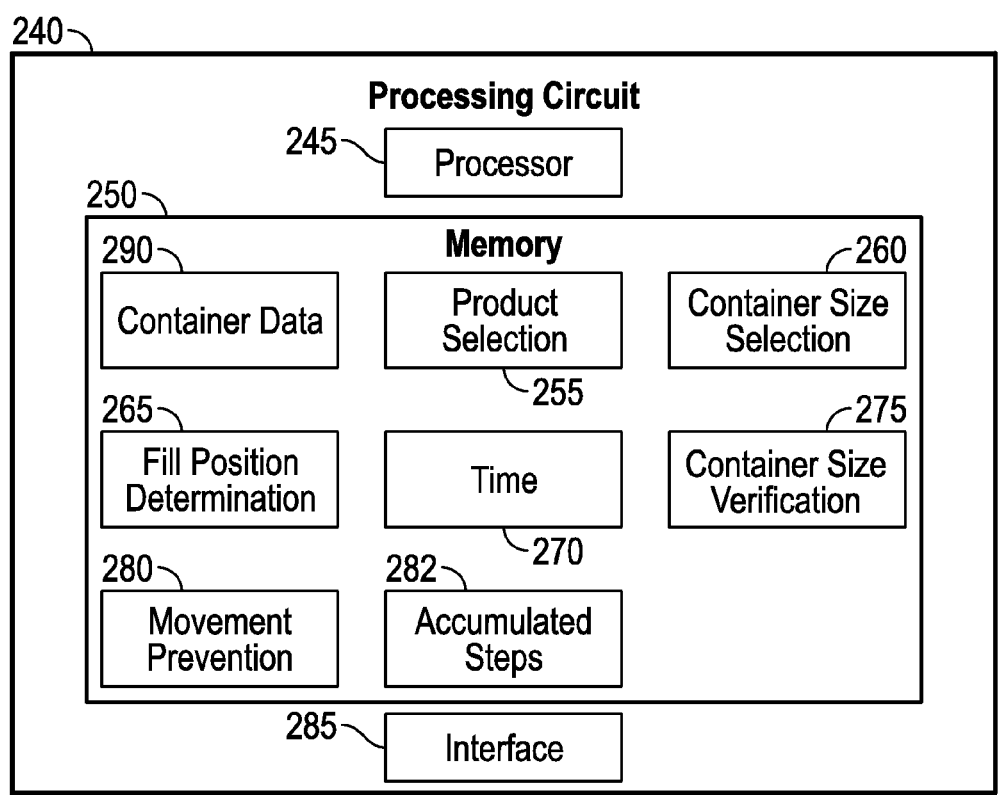
FIG. 6 is block diagram of a processing circuit configured to control the vending machine of FIG. 1.

Referring to FIG. 6, a block diagram of the processing circuit 240 is shown, according to an exemplary embodiment. The processor 245 may be or include one or more microprocessors (e.g., CPUs, GPUs, etc.), an application specific integrated circuit (ASIC), a circuit containing one or more processing components, a group of distributed processing components (e.g., processing components in communication via a data network or bus), circuitry for supporting a microprocessor, or other hardware configured for processing data. The processor 245 is also configured to execute computer code stored in memory 250 to complete and facilitate the activities described herein. Memory 250 can be any volatile or non-volatile computer-readable storage medium, or combinations of storage media, capable of storing data or computer code relating to the activities described herein. For example, memory 250 is shown to include computer code modules such as a frozen food product selection module 255, a container size selection module 260, a fill position determination module 265, a timer module 270, a container size verification module 275, a movement prevention module 280, and an accumulated steps module 282. When executed by the processor 245, the processing circuit 240 is configured to complete the activities described herein.

The processing circuit 240 also includes a hardware interface 285 for supporting the execution of the computer code frozen food product selection module 255, a container size selection module 260, a fill position determination module 265, a timer module 270, a container size verification module 275, a movement prevention module 280, and an accumulated steps module 282. An interface 285 may include hardware configured to receive data as input to the processing circuit 240 (e.g. from the user input device 145, the payment acceptor 150, and/or the presence sensors 190, 205, 210, and 215) and/or communicate data as output to another computing device (e.g., to a display). For example, the processing circuit 240 may receive container data 290 from one or more sensors (e.g., the presence sensors 190, 205, 210, and 215). The interface 285 may include circuitry to communicate data via any number of types of networks or other data communication channels. For example, the interface 285 may include circuitry to receive and transmit data via a wireless network or via a wired network connection. In another example, the interface 285 may include circuitry configured to receive or transmit data via a communications bus with other electronic devices.

Memory 250 may include container data 290. In general, container data 290 may include any data relating to the characteristics of the containers to be used with the vending machine 100. In some embodiments, container data 290 may include sensor data generated by one or more of the presence sensors 190, 205, 210, and 215 associated with the vending machine 100. Sensor data may include, but is not limited to, data regarding the presence of a container at one or more of the presence sensors 190, 205, 210, and 215. Container data 290 may also include user-provided data. User-provided data may include, but is not limited to, data regarding the container size selected by the user (e.g., via the user input device 145), payment for the desired frozen food product (e.g., via the payment acceptor 150), the frozen food product selected by the user, which spigot provides the selected frozen food product and the location of this spigot relative to the home position of the movable platform, known elapsed times for the movable platform 160 to move from the home position to a fill position while supporting a known type and size of container, and data regarding the components of the vending machine 100 to be controlled by the processing circuit 240.

Memory 250 may include product selection module 255. Product selection module 255 may be configured to identify the frozen food product selected by a user via the user input device 145. Such a selection can be made based on the flavor of the desired frozen product dispensed by the spigots 115, 120, and 125 (e.g., vanilla, chocolate, and twist) or based on the location of the spigot 115, 120, or 125 (e.g., left, right, and center) that dispenses the desired flavor of frozen food product. Product selection module 255 may be further configured to determine if sufficient funds have been deposited to pay for the selected frozen food product. In some embodiments, the vending machine specific tender (e.g., tokens, tickets, coupons, magnetized card) accepted by the payment acceptor 150 may be associated with a specific frozen product flavor or location.

Memory 250 may include container size selection module 260. Container size selection module 260 may be configured to identify the size and/or type of container selected by a user via the user input device 145. Such a selection may indicate a size of container (e.g., small, medium, large) to be filled with the selected frozen food product. Such a selection may also indicate a type of container (e.g., dish, cone, bowl, etc.) to be filled with the selected frozen food product. Container size selection module 260 may be further configured to determine the amount of frozen food product to be dispensed based on the selected container size and type (i.e., frozen food product portion size). The amount may be controlled by a dispense time (e.g., elapsed time that the appropriate spigot 115, 120, or 125 is open), by weight (e.g., as sensed by a weight sensor), by flow rate (e.g., as sensed by a flow sensor), or other appropriate method. Container size selection module 260 may be further configured to determine if sufficient funds have been deposited to pay for the selected container size and/or type. In some embodiments, the vending machine specific tender (e.g., tokens, tickets, coupons, magnetized card) accepted by the payment acceptor 150 may be associated with a specific container size and/or type. Container size selection module 260 may also make an adjustment to the frozen food product portion size based on the elapsed time between dispensing cycles. Frozen food product may expand (e.g., increase in volume and/or weight) the longer it sits in a freezer barrel 105 or 110 of the vending machine 100. Accordingly, the frozen food product portion size may be adjusted to decrease the portion size based on the time elapsed between dispensing cycles (e.g., the longer the time between dispensing cycles, the greater the decrease in the portion size).

Memory 250 may include fill position determination module 265. Fill position determination module 265 may be configured to determine to which of the three fill positions (i.e., one under each spigot 115, 120, and 120) the movable platform 160 will move from the home position. This determination may be made in response to inputs from the product selection module 255 and the container size selection module 260. Fill position determination module 265 may be further configured to track or otherwise determine the position of the movable platform 160 (e.g., based on position of linear actuators 170 and 175, based on inputs from presence sensors 205, 210, and 215, based on step count of stepper motor or motors used to move the gantry 165, etc.).

Memory 250 may include timer module 270. Timer module 270 is configured to track the elapsed time for the movable platform 160 to move from the home position to one of the fill positions.

Memory 250 may include container size verification module 275. Container size verification module 275 may be configured to compare known elapsed times for the movable platform 160 to move from the home position to a fill position while supporting a known type and size of container to the actual elapsed time tracked by the timer module 270. This comparison can be used to verify that the type and size of the container on the movable platform 160 matches the selected type and size of container (e.g., as identified by the container size selection module 260). If the selected container size and type is not verified, the frozen food product is not dispensed and the movable platform 160 returns to the home position to receive the correct size and type of container, or the correct amount of frozen food product based on the elapsed time is dispensed, rather than the amount called for based on the user selection. Alternatively, container size verification module 275 may be configured to function as the container size selection module 260 so that the container size is identified based on the comparison of the actual and known elapsed times for the movable platform 160 to move from the home position to a fill position while supporting a known type and size of container.

Memory 250 may include movement prevention module 280. Movement prevention module 280 may be configured to prevent movement of the movable platform 160 and the gantry 165 when the front door 135 or the access door 155 is open. Movement prevention module 280 may be further configured to prevent movement of the movable platform 160 and the gantry 165 when the vending machine 100 is in other configurations (e.g., the face plate 180 is not properly attached, a rear door is open, etc.). Alternatively or additionally, movement prevention module 280 may be a hard-wired interlock, rather than a computer code module, configured to prevent movement of the movable platform 160 and gantry 165 when the front door 135 or the access door 155 is open.

Memory 250 may include accumulated steps module 282. Accumulated steps module 282 is configured to count the accumulated steps for the gantry 165 to move the movable platform 160 from the home position to one of the fill positions. One or more stepper motors (e.g., one for movement in the x-direction and one for movement in the y-direction) may be used to move the gantry 165. Accumulated steps module 282 may itself count the number of accumulated steps or may receive an input from the stepper motor indicating the number of accumulated steps.

Figure 7:
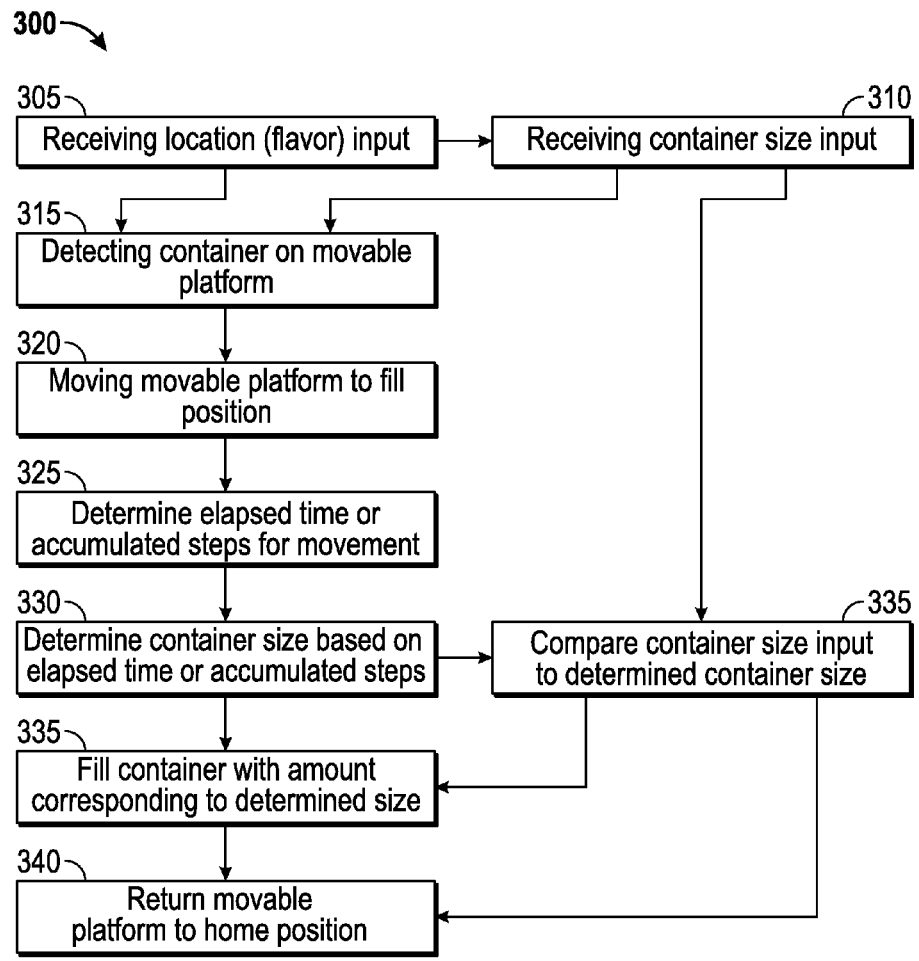
FIG. 7 is a flow chart of a method of operating an automatic frozen food product vending machine according to an exemplary embodiment
Figure 8:
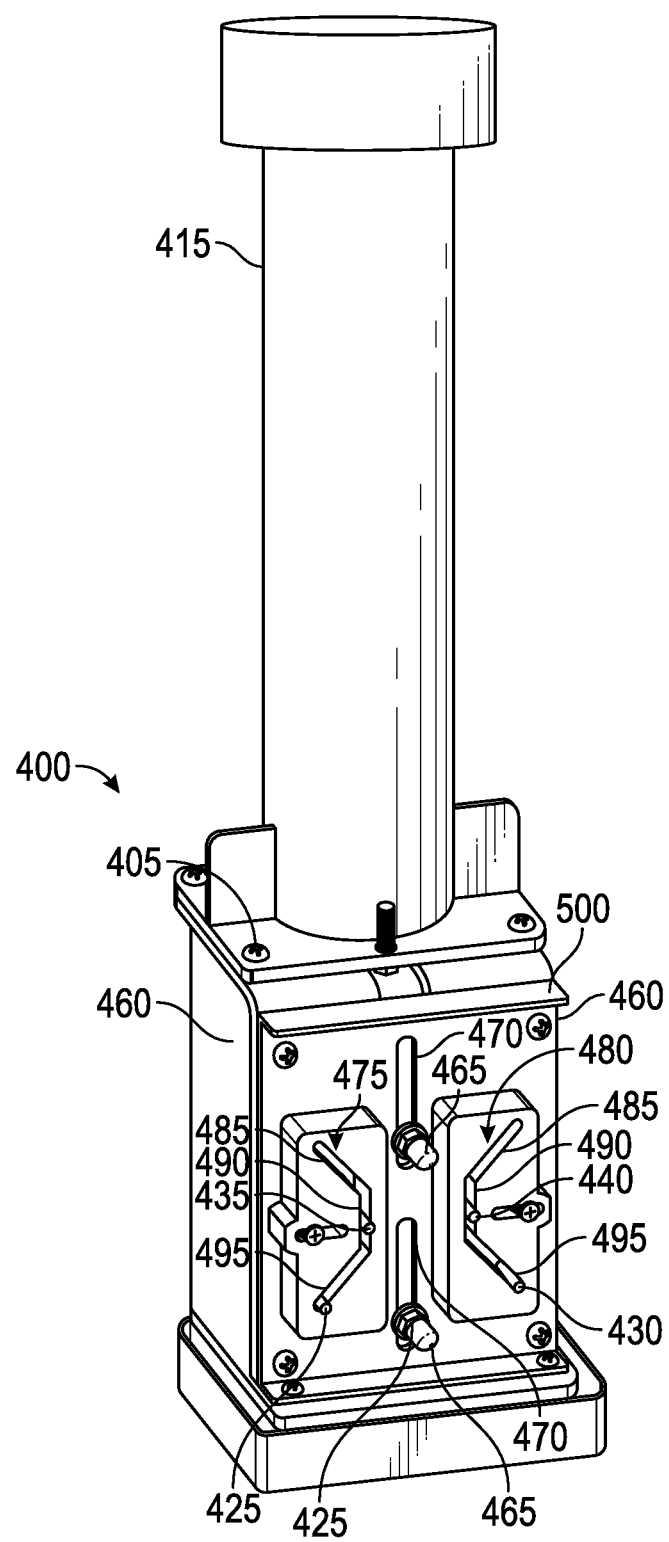
FIG. 8 is a perspective view of an automatic ice cream cone dispenser according an exemplary embodiment.

FIG. 7 illustrates a method of operating an automatic frozen food product vending machine (e.g., the vending machine 100), according to an exemplary embodiment. The method 300 includes receiving a location input from a user input device (e.g., the user input device 145) (step 305). The location corresponds to one of three spigots (e.g., the spigots 115, 120, and 125) and/or the corresponding flavor dispensed by the selected spigot (e.g., vanilla, chocolate, or twist). In some embodiments, a container size input is received from the user input device (e.g., the user input device 145) (step 310). The user then opens an access door (e.g., the access door 155), places a container of the selected size onto a movable platform (e.g., the movable platform 160), and closes the access door. The presence of the container on the movable platform is detected (e.g., by presence sensor 190) (step 315). The movable platform then moves to the appropriate fill position for the location input (step 320). The elapsed time or accumulated steps of one or more stepper motors for this movement is determined (step 325). The size of the container on the movable platform is determined based on a comparison of known elapsed times or accumulated steps for the movable platform to move from the home position to the fill position while supporting a known type and size of container to the actual elapsed time or accumulated steps (step 330). In some embodiments, a comparison of the container size input and the container size determined by the elapsed time or accumulated steps is made (step 335). In some embodiments, if this comparison indicates a mismatch, the moving platform may return to the home position to receive the correct size container (step 340). In other embodiments, if the comparison verifies the correct container size or if the comparison identifies a mismatch, the container is filled with the amount of frozen food product corresponding to the determined container size (step 345). After the container is filled with frozen food product, the movable platform returns to the home position (step 340), where the user can open the access door to receive the container filled with the selected frozen food product. In some embodiments, the movable platform is prevented from moving when the access door is open. In some embodiments, lights, sounds, or other attractive features or entertainment devices are activated while the movable platform 160 is in motion and/or while the frozen food product is being dispensed.

FIGS. 8-12 illustrate an ice cream cone dispenser according to an exemplary embodiment. The dispenser 400 includes a housing 405 that defines a chamber 410. A chute 415 is attached to the housing 405 above the chamber 410. The chute 415 holds a stack of multiple ice cream cones 420 that are stacked one inside the next in a conventional manner. Each cone 420 includes a lip 422 that is vertically spaced apart from the lip of the adjacent stacked cone by a known distance. In some embodiments, multiple chutes are movably coupled to the housing. Each of the chutes holds a stack of multiple cones of different sizes and can be moved relative to the housing so that the cones in the chute above the chamber are the cones that will be dispensed by the dispenser 400.

Two pairs of rods are disposed within the chamber 410. The first pair of rods 425 and 430 are located vertically below the second pair of rods 435 and 440. A guide plate 445 receives an end of each of the rods 425 and 430 in a first horizontal guide path 450. In some embodiments, each of rods 425 and 430 is received in its own horizontal guide path and the two horizontal guide paths are collinear. The guide plate 445 also receives an end of each of the rods 435 and 440 in a second horizontal guide path 455. In some embodiments, each of rods 435 and 440 is received in its own horizontal guide path and the two horizontal guide paths are collinear. The horizontal guide paths 450 and 455 restrict the movement of the rods 425 and 430, and 435 and 440, respectively.

A movable actuator 460 is coupled to the housing 405 opposite the guide plate 445. One or more protrusions 465 from the housing 405 are received in a vertical guide path 470 in the actuator 460 to limit the actuator 460 to vertical movement relative to the housing 405. The actuator 460 also includes two rod guide paths 475 and 480. The rod guide path 475 receives the second end of rods 425 and 435. The rod guide path 480 receives the second end of rods 430 and 440. Each of the rod guide paths 475 and 480 include a first angled portion 485, a straight portion 490, and a second angled portion 495. Vertical movement of the actuator 460 causes the rod guide paths 475 and 480 to move relative to the rods 425, 430, 435, and 440. The guide paths 475 and 480 move the pairs of rods between two positions: a wide position where the rods 425 and 430 or 435 and 440 are horizontally spaced apart a distance wider than the outer diameter of the lips 422 of the cones 420 and a narrow position where the rods 425 and 430 or 435 and 440 are spaced apart a distance narrower than the outer diameter of the lips 422 of the cones 420 to support a cone 420 (e.g., so that the lip 422 of a cone 420 rests on top of the rods). In some embodiments, each of the rod guide paths 475 and 480 is formed in its own block of material capable of supporting the rods and allowing for easy movement of the rods (e.g., a nylon or plastic block).

In the illustrated embodiment, the actuator 460 includes a lip 500 that can be grasped by a user to move the actuator 460 vertically. In some embodiments, the actuator 460 is moved automatically (e.g., by a linear actuator, a piston, a motor-driven gear rack, or other appropriate device). By moving the actuator 460 up and down, the pairs of rods support and then release successive cones 420 in the stack. In some embodiments, a spring biases the actuator 460 towards a position (e.g., towards a lowered position). In some embodiments a damper or dash pot is used to dampen the movement of the actuator 460.

FIGS. 9-12 illustrate the chamber 410 with the actuator 460 removed for clarity (on the left of the figure) and the actuator 460 (on the right of the figure). FIGS. 9-12 show the position of the rods 425, 430, 435, and 440 and the actuator 460 during a single cycle of the dispenser 400. The stack of cones 420 are represented by three cones 420A, 420B, and 420C.

Figure 9:
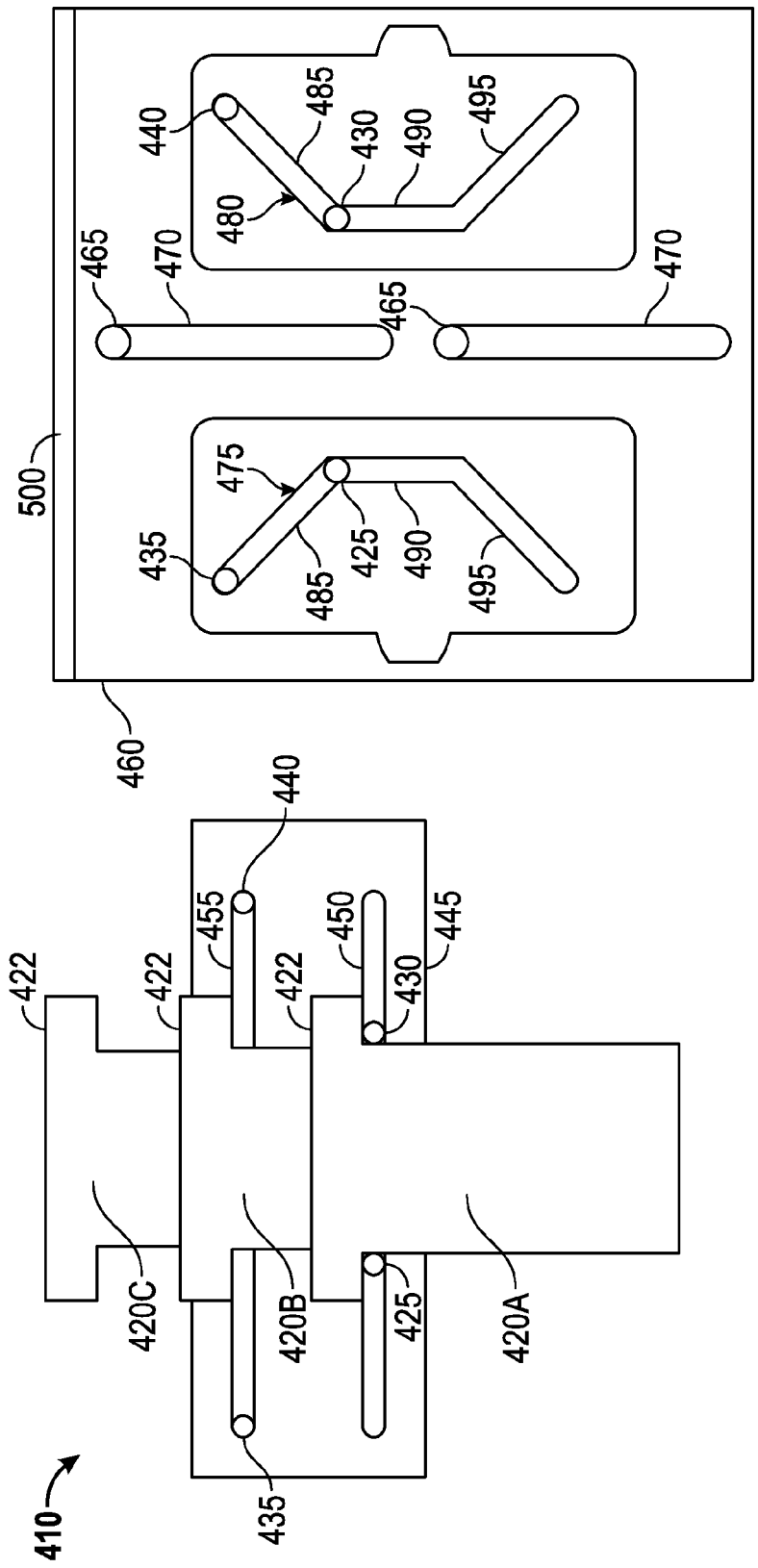
FIG. 9 is a front view of a chamber and an actuator of the dispenser of FIG. 8, with the actuator in a first position.

As shown in FIG. 9, the rods 425 and 430 are positioned in the narrow position by the straight portions 490 of the guide paths 475 and 480 so that the cone 420A is supported by the rods 425 and 430. The rods 435 and 440 are positioned in the wide position by the first angled portions 485 of the guide paths 475 and 480 and are not in contact with any of the cones 420.

Figure 10:
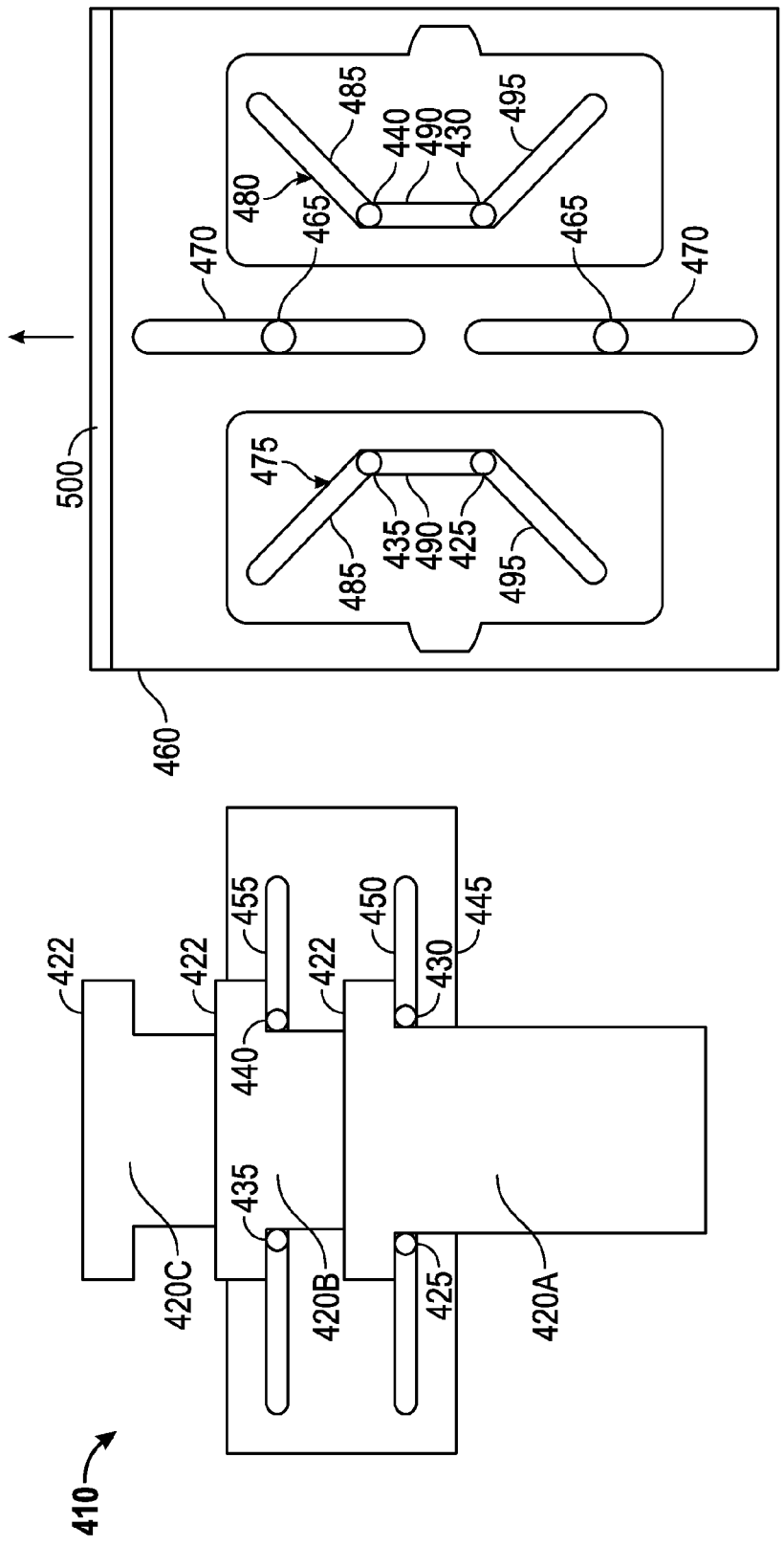
FIG. 10 is a front view of the chamber and the actuator of the dispenser of FIG. 8, with the actuator in a second position.

As shown in FIG. 10, as the actuator 460 is moved upwards, the rods 425 and 430 are maintained in the narrow position by the straight portions 490 of the guide paths 475 and 480 to continue to support the cone 420A and the rods 435 and 440 are moved to the narrow position by the straight portions 490 of the guide paths 475 and 480 so that the cone 420B is supported by the rods 435 and 440.

Figure 11:
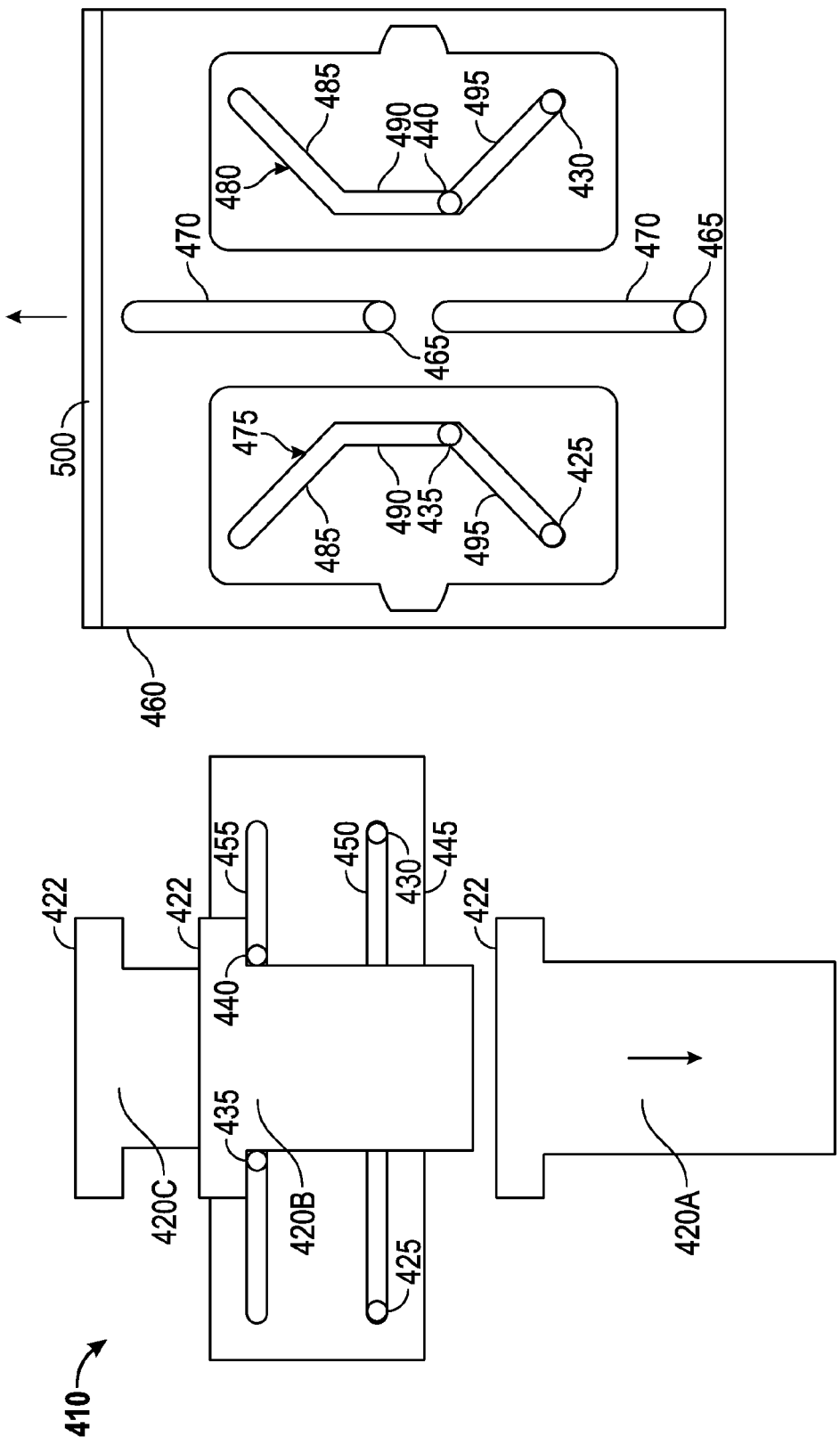
FIG. 11 is a front view of the chamber and the actuator of the dispenser of FIG. 8, with the actuator in a third position.

As shown in FIG. 11, as the actuator 460 continues to move upwards, the rods 425 and 430 are moved to the wide position by the second angled portions 495 of the guide paths 475 and 480 to release the cone 420A, allowing it to exit the chamber 410. In some embodiments, the cone 420A is dispensed to a user's hand or a support surface. In some embodiments, the cone 420 is dispensed to a movable platform of a automatic frozen food product vending machine (e.g., vending machine 100). The rods 435 and 440 are maintained in the narrow position by the straight portions 490 of the guide paths 475 and 480 to continue to support cone 420B, so that only a single cone (cone 420A) is dispensed. In some embodiments, the vending machine 100 includes the dispenser 400. The movable food platform 160 moves to a container receiving position below the chamber 415 to receive a user-selected container and then cycles as described above to dispense the selected frozen food product. In some embodiments, the container receiving position and the home position share the same location.

Figure 12:
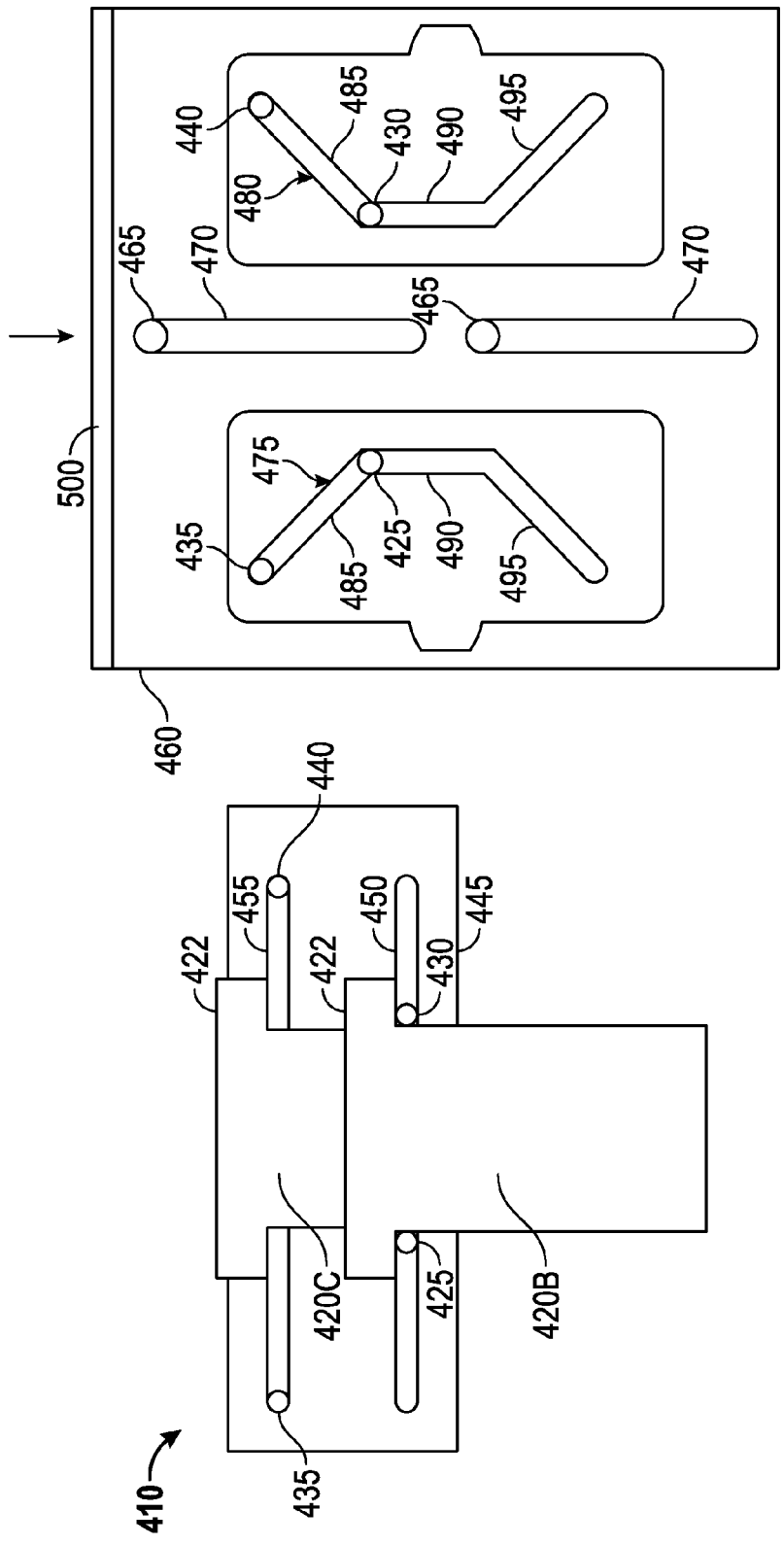
FIG. 12 is a front view of the chamber and the actuator of the dispenser of FIG. 8, with the actuator in the first position.

As shown in FIG. 12, the actuator 460 completes its cycle by moving downwards to its original position. The rods 435 and 440 are moved to the wide position by the first angled portions 485 of the guide paths 475 and 480 to release the cone 420B. The rods 425 and 430 are moved to the narrow position by the straight portions 490 of the guide paths 475 and 480 to support the cone 420B.

Alternatively, dispenser 400 may be configured to dispense containers other than ice cream cones (e.g., dishes, bowls, cups, or other food product containers) that are capable of being stacked and including lips similar to those described above for the cones 420.

The construction and arrangement of the apparatus, systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show or the description may provide a specific order of method steps, the order of the steps may differ from what is depicted. Also two or more steps may be performed concurrently or with partial concurrence. Such variation will depend on various factors, including software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An automatic frozen food product vending machine, comprising:
    a first freezer barrel configured to produce a first frozen food product;
    a first spigot fluidly connected to the first freezer barrel, the first spigot for dispensing the first frozen food product;
    a second freezer barrel configured to produce a second frozen food product;
    a second spigot fluidly connected to the second freezer barrel, the second spigot for dispensing the second frozen food product;
    a third spigot fluidly connected to both the first freezer barrel and the second freezer barrel, the third spigot for dispensing a mixture of the first frozen food product and the second frozen food product;
    a movable platform for supporting a container to receive frozen food product, the movable container movable among a home position, a first fill position below the first spigot, a second fill position below the second spigot, and a third fill position below the third spigot;
    a container presence sensor configured to detect the presence of a container on the movable platform, wherein the container presence sensor is attached to the movable platform;
    a first presence sensor located below the first spigot, the first presence sensor configured to detect the container on the movable platform when the movable platform is in the first fill position;
    a second presence sensor located below the second spigot, the second presence sensor configured to detect the container on the movable platform when the movable platform is in the second fill position;
    a third presence sensor located below the third spigot, the third presence sensor configured to detect the container on the movable platform when the movable platform is in the third fill position; and
    a processing circuit configured to determine an elapsed time for the movable platform to move from the home position to one of the first fill position, the second fill position, and the third fill position.

2. The automatic frozen food product vending machine of claim 1, wherein the processing circuit is further configured to determine a size of the container on the movable platform based on the elapsed time.

3. The automatic frozen food product vending machine of claim 2, wherein the processing circuit is further configured to open the appropriate spigot and fill the container with an amount of frozen food product corresponding to the size of the container.

4. The automatic frozen food product vending machine of claim 3, further comprising:
    a user input device coupled to the processing circuit to provide user inputs to the processing circuit;
    wherein the processing circuit is further configured to determine which of the first fill position, the second fill position, and the third fill position to move the movable container to in response to a location input.

5. The automatic frozen food product vending machine of claim 4, wherein the processing circuit is further configured to verify the size of the container by comparing a container size input to the elapsed time.

6. The automatic frozen food product vending machine of claim 5, wherein the processing circuit is further configured to open the appropriate spigot and fill the container with an amount of frozen food product corresponding to the verified size of the container.

7. The automatic frozen food product vending machine of claim 4, further comprising:
    a front door enclosing the first spigot, the second spigot, the third spigot, and the home position, the front door including an access door for accessing the movable platform when the movable platform is in the home position;
    wherein the processing circuit is further configured to prevent movement of the movable platform when the access door is open.

8. The automatic frozen food product vending machine of claim 1, further comprising:
    a gantry connected to the movable container platform, the gantry movable in a first direction and a second direction substantially perpendicular to the first direction.

9. The automatic frozen food product vending machine of claim 8, wherein the first direction is substantially parallel to the direction of gravity.

10. The automatic frozen food product vending machine of claim 1, further comprising:
    a user input device coupled to the processing circuit to provide user inputs to the processing circuit;
    wherein the processing circuit is further configured to determine which of the first fill position, the second fill position, and the third fill position to move the movable container to in response to a location input from the user input.

11. A method of operating an automatic frozen food product vending machine, comprising:
    receiving a location input from a user input device;
    detecting a container on a movable platform;
    moving the movable platform to a fill position under one of three spigots for dispensing a frozen food product in response to the location input;
    determining an elapsed time for the movable platform to move from a home position to the fill position;
    determining a container size based on the elapsed time;
    filling the container with frozen food product based on the determined container size; and
    returning the movable platform to the home position.

12. The method of claim 11, further comprising:
receiving a container size input from the user input device; and
comparing the container size input to the determined container size.

13. The method of claim 11, wherein the fill position is established when a presence sensor is activated by the container on the movable platform.

14. An automatic frozen food product vending machine, comprising:
- a first freezer barrel configured to produce a first frozen food product;
- a first spigot fluidly connected to the first freezer barrel, the first spigot for dispensing the first frozen food product;
- a second freezer barrel configured to produce a second frozen food product;
- a second spigot fluidly connected to the second freezer barrel, the second spigot for dispensing the second frozen food product;
- a third spigot fluidly connected to both the first freezer barrel and the second freezer barrel, the third spigot for dispensing a mixture of the first frozen food product and the second frozen food product;
- a movable platform for supporting a container to receive frozen food product;
- a gantry connected to the movable platform for linearly moving the container among a home position, a first fill position below the first spigot, a second fill position below the second spigot, and a third fill position below the third spigot, wherein the gantry is linearly movable in a first direction and a second direction substantially perpendicular to the first direction, wherein the first direction is substantially parallel to the direction of gravity;
- a first stepper motor configured to linearly move the gantry in the first direction;
- a second stepper motor configured to linearly move the gantry in the second direction; and
- a processing circuit configured to determine a number of accumulated steps of the stepper motors to move the movable platform from the home position to one of the first fill position, the second fill position, and the third fill position.

15. The automatic frozen food product vending machine of claim 14, wherein the processing circuit is further configured to open the appropriate spigot and fill the container with an amount of frozen food product corresponding to the size of a container.

16. The automatic frozen food product vending machine of claim 14, further comprising:
- a user input device coupled to the processing circuit to provide user inputs to the processing circuit;
- wherein the processing circuit is further configured to determine which of the first fill position, the second fill position, and the third fill position to move the movable container to in response to a location input from the user input.

* * * * *